US011698085B2

(12) United States Patent
Athimannil et al.

(10) Patent No.: US 11,698,085 B2
(45) Date of Patent: Jul. 11, 2023

(54) ROD END COVER

(71) Applicants: Goodrich Aerospace Services Private Limited, Karnataka (IN); Goodrich Actuation Systems Limited, Solihull (GB)

(72) Inventors: Jithin Athimannil, Bangalore (IN); Chandru Revanna, Bangalore (IN); Jeremy Kracke, Staffordshire (GB); Richard McKay, Shropshire (GB)

(73) Assignees: GOODRICH AEROSPACE SERVICES PRIVATE LIMITED, Karnataka (IN); GOODRICH ACTUATION SYSTEMS LIMITED, England (GB)

( * ) Notice: Subject to any disclaimer, the term of this patent is extended or adjusted under 35 U.S.C. 154(b) by 244 days.

(21) Appl. No.: 17/076,943

(22) Filed: Oct. 22, 2020

(65) Prior Publication Data

US 2021/0040963 A1 Feb. 11, 2021

Related U.S. Application Data

(62) Division of application No. 15/592,268, filed on May 11, 2017, now Pat. No. 10,844,882.

(30) Foreign Application Priority Data

May 11, 2016 (IN) .............................. 201641016478

(51) Int. Cl.
*F15B 15/14* (2006.01)
*F16J 7/00* (2006.01)

(52) U.S. Cl.
CPC ...... *F15B 15/1457* (2013.01); *F15B 15/1423* (2013.01); *F16J 7/00* (2013.01);
(Continued)

(58) Field of Classification Search
CPC ..... F15B 15/1457; F15B 15/1423; F16J 7/00; Y10S 220/21; Y10T 29/49826; Y10T 74/2152; Y10T 403/17; Y10T 403/32606
(Continued)

(56) References Cited

U.S. PATENT DOCUMENTS 1,591,342 A 7/1926 Stone
2,100,965 A 11/1937 Kuske
(Continued)

FOREIGN PATENT DOCUMENTS

DE 102012207343 A1 11/2013
JP 2013142415 A 7/2013
WO 2014035300 A1 3/2014

OTHER PUBLICATIONS

European Search Report for Application No. 17170290.5, dated Oct. 13, 2017, 8 pages.

*Primary Examiner* — Greg Binda
(74) *Attorney, Agent, or Firm* — Cantor Colburn LLP

(57) ABSTRACT

A cover for a rod end of an actuator comprises a mounting collar for surrounding and mounting to a portion of the rod end. The collar is deformable such that it may be mounted over a rod eye mounted to the rod end. The cover further comprises a shield extending from the collar and shaped such that when attached to the rod end the shield shields a portion of rod end to prevent fluid or foreign object ingress to the rod end.

14 Claims, 3 Drawing Sheets

(52) U.S. Cl.
CPC ........ *Y10S 220/21* (2013.01); *Y10T 29/49826* (2015.01); *Y10T 74/2152* (2015.01); *Y10T 403/17* (2015.01); *Y10T 403/32606* (2015.01)

(58) Field of Classification Search
USPC .......................................... 403/23; 244/99.3
See application file for complete search history.

(56) References Cited

U.S. PATENT DOCUMENTS

| | | |
|---|---|---|
| 4,174,595 A | 11/1979 | Watson |
| 4,407,600 A | 10/1983 | Thompson |
| 4,408,924 A | 10/1983 | Huebner |
| 5,074,390 A | 12/1991 | Fuhrmann et al. |
| 5,528,867 A * | 6/1996 | Thompson .............. E04G 21/24 |
| 6,659,399 B1 | 12/2003 | Bagnoli et al. |
| 2014/0231198 A1 | 8/2014 | Ackermann et al. |
| 2017/0328386 A1 | 11/2017 | Athimannil et al. |

\* cited by examiner

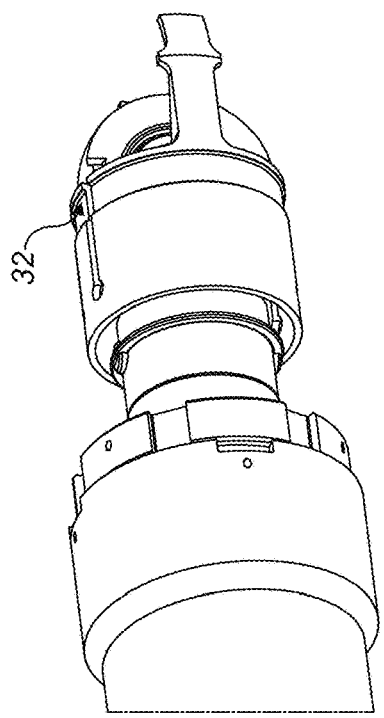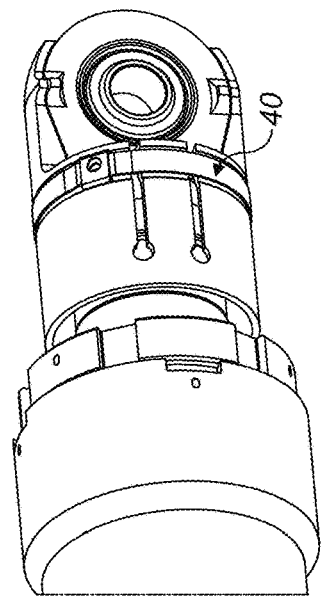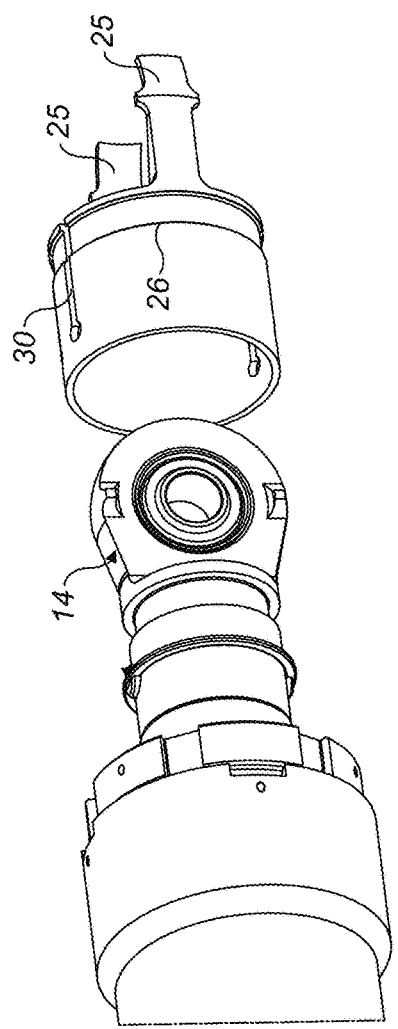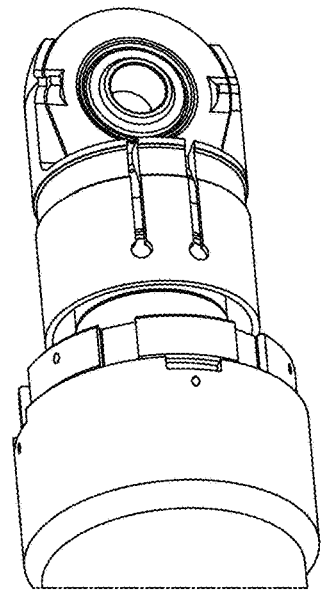
FIG. 4b
FIG. 4d
FIG. 4a
FIG. 4c

ROD END COVER

CROSS REFERENCE TO RELATED APPLICATIONS

This application is a division of U.S. patent application Ser. No. 15/592,268, filed May 11, 2017 (Now U.S. Pat. No. 10,844,882, Issued Nov. 24, 2020), which claims priority to Indian Patent Application No. 201641016478 filed May 11, 2016, the disclosures of which are incorporated herein by reference in their entirety.

TECHNICAL FIELD

The present disclosure relates to a cover for a rod end of a linear actuator.

BACKGROUND

Aircraft systems typically contain a number of linear actuators such as hydraulic actuators. For example, hydraulic actuators may be used to operate doors for accessing components within an engine nacelle. These actuators are often moving large flexible panels and therefore are attached to the panels via a rod end that is spring loaded to the actuator piston rod. The spring loaded rod end acts as a lost motion device to accommodate flexure in the panels.

Current rod end design includes a hollow cylindrical shaft for attachment to a piston rod and a rod eye for attachment to a clevis. The hollow shaft includes a slot or hole extending through a wall of the shaft to allow the rod end be mounted to the piston rod in such a way that the rod end may move axially relative to the piston rod under the spring loading. However, this slot provides a flow path for water to enter the internal cavity of the hollow shaft and accumulate in the rod end, piston rod or actuator. Water inside the system will swell as it freezes which may cause damage to the rod end, piston rod or actuator.

It is therefore desired to minimise water ingress via the rod end.

SUMMARY

Disclosed herein is a cover for a rod end of an actuator. The cover comprises a mounting collar for surrounding and mounting to a portion of the rod end. The collar is deformable such that it may be mounted over a rod eye mounted to the rod end. The cover further comprises a shield extending from the collar and shaped such that when attached to the rod end the shield shields a portion of rod end to prevent fluid or foreign object ingress to the rod end.

Also disclosed herein is a rod end assembly comprising a rod end and a cover. The rod end comprises a hollow shaft and a rod eye mounted to an end of the shaft. The shaft end has an opening extending through a wall thereof. The cover is mounted to the rod end and comprises a mounting collar mounted to a mounting portion of the rod end. The collar is deformable such that it may be mounted to the rod end over the rod eye. The cover further comprises a shield extending from the collar and shielding the opening in the shaft wall to prevent fluid or foreign object ingress to the rod end.

In an embodiment of any of the above, the shield is a skirt extending around the entire circumference of the mounting collar and projecting therefrom. The skirt may be a hollow cylindrical tube, for example.

The collar may include at least one axial split to allow parts of the collar to move relative to one another, the at least one split extending along the whole axial length of the collar and shield. In an embodiment, the collar includes two diametrically opposed axial splits.

In an alternative arrangement, the collar may comprise at least two splits circumferentially spaced from one another, wherein the at least two splits extend down the collar and only part of the length of the shield to define a deformable finger therebetween. For example, the collar and shield may comprise four of such splits arranged in two opposing pairs to form two opposing fingers of the cover.

The cover may further comprise an alignment portion for positioning of the cover relative to rod eye. For example, the alignment portion may be a loop extending from one side of the collar to the opposite side of the collar on the opposite side of the collar to the shield or alternatively the alignment portion may comprise two diametrically opposed arms extending in an opposite axial direction to the shield. Parts of, or the entire, alignment portion may be configured to conform to an external surface of the rod eye for mounting thereto.

The cover may further comprise one or more straps, bands or clips surrounding the collar or shield for securing the cover onto the rod end. The collar or shield may further include one or more circumferential grooves for housing the straps, bands or clips.

A method of assembling a rod end and cover is also described herein. The method comprises providing a rod end comprising a hollow shaft and a rod eye mounted to an end of the shaft and the shaft end having an opening extending through a wall thereof, the rod end being attached to a piston rod. The method further comprises providing a cover as described above and mounting the cover to the rod end without removing the rod end from the piston rod by pushing the cover onto the rod end while deforming the collar of the cover.

Deforming the cover may include prising the collar apart between two axial splits extending the whole length of the collar and shield.

Deforming the cover may include deflecting fingers formed in the collar. In such an embodiment, the method may further comprise orienting the fingers such that they deflect over a widest part of the rod eye. The method may further comprise rotating the cover such that the fingers are circumferentially spaced from the opening in the rod end shaft.

The above method may involve retro-fitting the cover to a rod end in an existing actuation system.

BRIEF DESCRIPTION OF DRAWINGS

FIG. 4*a* shows an exploded view of a third cover and a rod end attached to a piston rod of an actuator prior to attachment of the cover FIG. 4*b* show the assembly of FIG. 4*a* with the cover being assembled FIG. 4*c* shows the assembly of FIG. 4*a* with the cover in its final position on the rod end FIG. 4*d* shows the assembly of FIG. 4*c* with a strap for holding the cover in position

DETAILED DESCRIPTION

Figure 1:
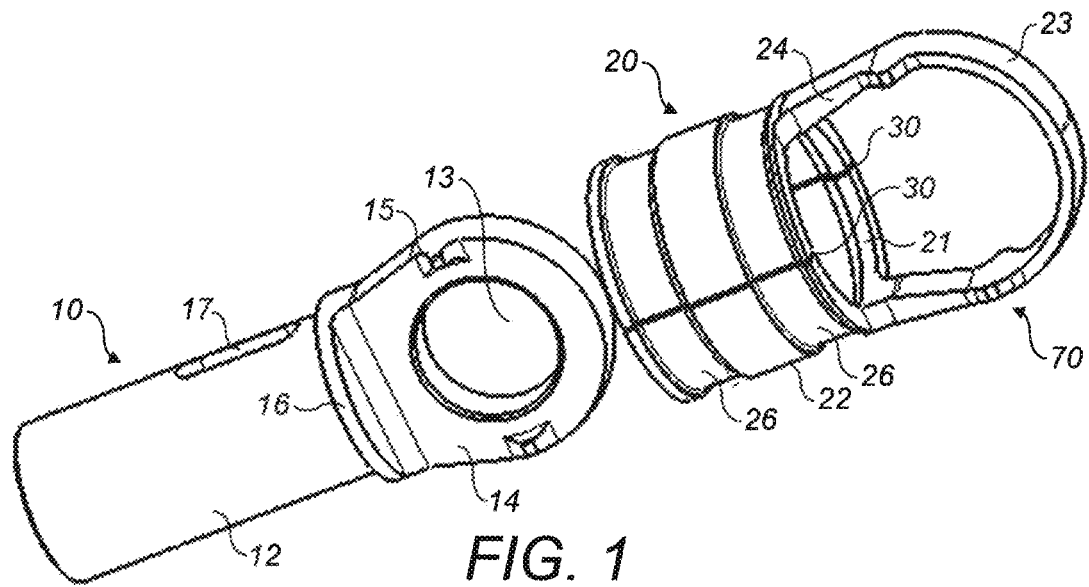
FIG. 1 shows an exploded view of a first cover and a rod end prior to assembly
Figure 5:
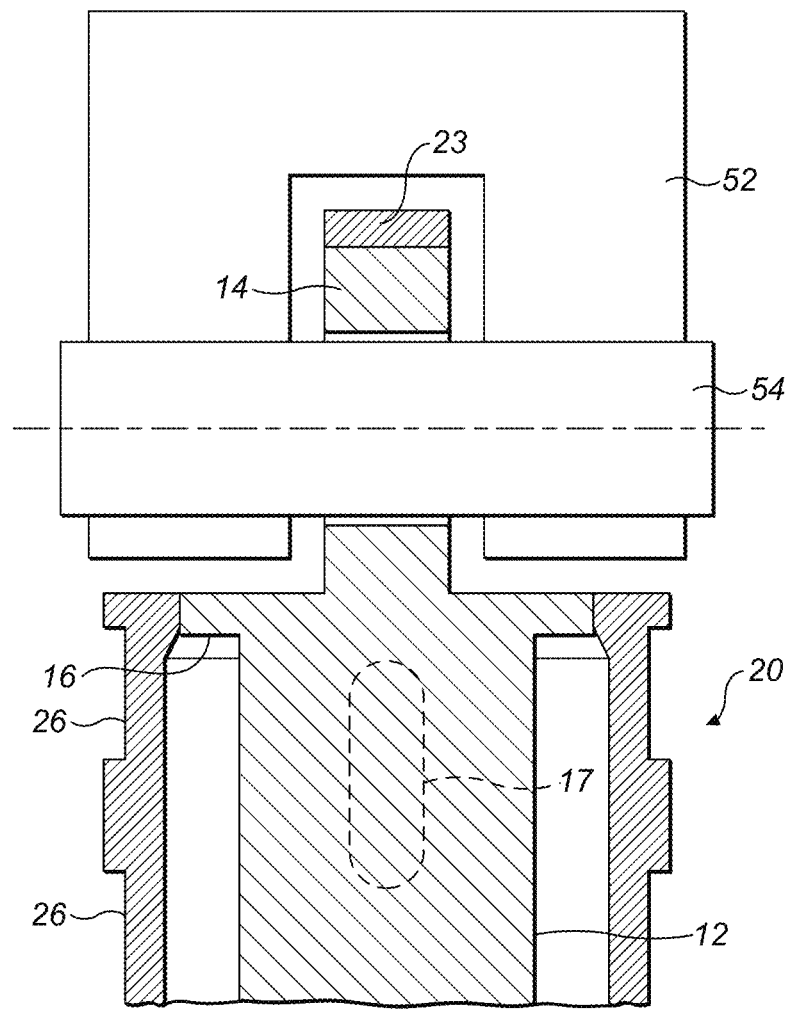
FIG. 5 shows a cross sectional view of the cover and rod end of FIGS. 1 and 2, with the rod end attached to a clevis

FIG. 1 shows a rod end 10 of the type typically attached to a piston rod of a hydraulic actuator (not shown). The rod end 10 has a hollow cylindrical shaft 12 for mounting to an end of a piston rod and a rod eye 14. The rod eye 14 includes a cylindrical bore 13 for receiving a clevis pin 54 (as shown in FIG. 5) such as those found in existing power door opening systems in aircraft, for example. The rod eye further includes protrusions 15 for engaging a complementary groove in the clevis.

The rod end 10 also includes a flange 16 which acts as a stop for axial movement of the rod end 10 relative to the piston rod. The maximum diameter of the rod eye 14 is larger than the diameter of the flange 16 meaning that a device with sufficiently large diameter to fit over the eye 14 will be unable to effectively engage with the flange 16.

The rod end 10 further includes an axially extending slot 17 formed in the shaft 12. The slot 17 extends through a wall of the shaft 12 to allow the rod end 10 to be pinned to a piston rod in such a way that it may move axially relative to the piston rod but not rotationally. The slot 17 therefore provides a flow path for water to enter the internal cavity of the hollow shaft 12 and from there into the piston rod.

FIG. 1 also shows a first embodiment of a cover 70 for mounting to the rod end 10. The cover 70 has a main body 20 which is shaped such that it surrounds an upper portion of the rod end 10. The body 20 includes a mounting collar 21 for engagement with the flange 16 which acts as a mounting portion of the rod end 10. The mounting collar 21 has an internal diameter approximately equal to the external diameter of the flange 16 for a tight fit therewith.

The cover 70 further includes a cylindrical skirt 22 extending in a first axial direction from the mounting collar 21 and an alignment portion 24 extending in the opposite axial direction from the mounting collar 21.

Figure 2:
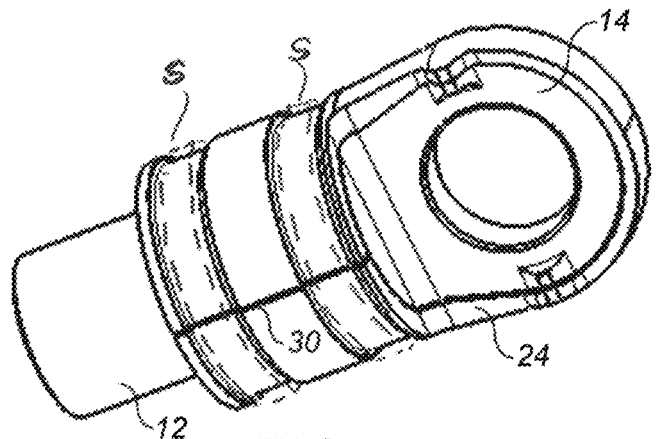
FIG. 2 shows a perspective view of the cover of FIG. 1 mounted on the rod end

As shown in FIG. 2, when mounted to the rod end 10, the cylindrical skirt 22 of the cover 70 extends over a portion of the rod end shaft 12 and shields the slot 17 thereby obstructing the flow path for water entering the shaft 12 via the slot 17.

Although the described embodiment includes a cylindrical skirt 22, it will be appreciated that other forms of shield may be provided in order to shield the radial opening or slot 17. Although a cylindrical tube may be simple to form, for example on a lathe, alternatively the shield or skirt 22 could be moulded to any shape or size that shields the opening 17. For example the skirt 22 might extend over the opening 17 but not extend completely around the rod end 10. Such an embodiment may reduce the amount of material needed for the cover 70. As shown in the embodiment, the skirt 22 may be configured to extend over a portion of the rod end 10 from the collar 21 to beyond the opening 17 i.e. completely cover the opening 17. Such an arrangement may provide the most comprehensive protection. However, alternatively the skirt 22 could extend over a portion of the rod end 10 but stop over or before the opening 17. In this arrangement the skirt 22 may deflect water away from the slots 17 without completely covering them.

In this embodiment, the alignment means 24 is in the form of a loop extending from the skirt 22. The loop is shaped such that it over-wraps the rod eye 14, in other words the internal geometry of the loop matches the external geometry or outer diameter of the rod eye 14 and extends thereover. As shown in FIG. 5, the thickness of the loop 23 is such that the alignment means does not interfere with the rotation of the rod eye within the clevis 52 as illustrated in FIG. 5. The alignment means also conforms to the protrusions 15 in the rod eye 14.

The alignment means 24 thus helps position the cover 70 when mounting it to the rod end by preventing the cover 70 from moving further axially down the rod end 10 towards the piston rod. The alignment of the alignment means with the eye 14 also ensures the correct orientation to the cover 70 and may prevent rotational movement of the cover 70 about the axis of the shaft 12 when the clevis 52 and rod end 10 are assembled.

The collar 21 and skirt 22 include two diametrically opposed, axially extending splits 30 extending along the axial length of the collar 21 and skirt 22. The splits 30 are positioned on the skirt 22 such that when the cover 70 is mounted to the rod end 10, the splits 30 are circumferentially spaced (i.e. not aligned) with the slot 17 of the rod end 10.

The cover 70 is made from a resilient or pliable material such as corrosion resistant steel or injection moulded polymer such that radial force applied to the inside surface of the skirt 22 causes the cover 70 to deform and the skirt 22 to open up and thereby fit over the rod eye 14 despite the internal surface of the cover body 20 and the skirt diameter being smaller that the widest part of the rod eye 14. The cover 70 then regains its former shape once it has passed over the widest part of the rod eye 14. The internal surface of the body 20 can thus engage with the flange 16 and the cover 70 can be mounted without having to remove the rod end 10 from the actuator assembly. In this way the cover 70 can be retro-fitted onto existing rod end and piston rod assemblies.

The collar 21 is deformable such that different parts of the cover 70 can move relative to each other thereby allowing the cover 70 to be mounted to a rod end 10. The skirt 22, for example, may be deformable to allow it increase in diameter to fit over a rod eye 14. The cover 70 may be configured such that it can be deformed in this way manually or with the use of a tool. The cover 70 may be made from resilient or flexible material. The cover 70 may be partially resilient or flexible i.e. parts of the cover 70 may be resilient or flexible and other parts of the cover 70 may be rigid. The cover 70 may include a resilient collar 21, skirt 14 and/or a resilient alignment portion 24, for example.

The cover 70 further includes two axially spaced grooves 26 extending circumferentially around the skirt 22 at either axial end of the skirt 22. The grooves 26 are sized and shaped to such that a strap, band or jubilee clip S (shown schematically by dotted lines in FIG. 2) can be used to secure the cover 70 against the stop flange 16 of the rod end 10.

Figure 3:
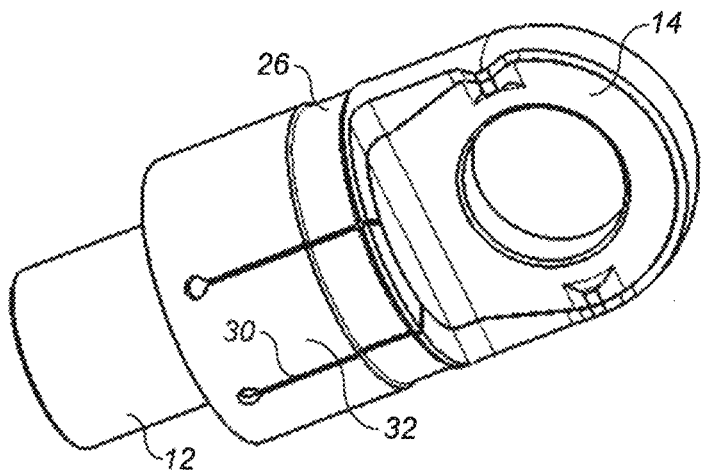
FIG. 3 shows a perspective view of a second cover mounted to a rod end

FIG. 3 shows a second embodiment of the cover 70. The cover 70 of FIG. 3 is substantially as described above in relation to the first embodiment except that instead of having two splits 30 extending the whole length of the skirt 20, the cover 70 includes four splits 30 all extending along only a portion of the length of the skirt 22. The splits 30 of this embodiment extend all the way through the collar 21 and from the top of the skirt 22, at an axial position at which the alignment means 24 is attached to the skirt 22, to a point partway down the axial length of the skirt 22 spaced from the actuator end of the cover 70. The four splits 30 are positioned in two diametrically opposed pairs. The splits 30 of each pair are circumferentially spaced from each other to define deformable fingers 32 therebetween.

This embodiment also differs from that described above in that it includes only one circumferential groove 26. The groove 26 is positioned at the top of the skirt 22 such that a strap, band or clip attached in the groove 26 secures the cover 70 to the flange 16 of the rod end 10 and prevents outward deflection of the fingers 32.

FIGS. 4a to 4d show a third embodiment of the cover 70 at various stages during its assembly on a rod end 10. FIGS. 4a-d show the rod end 10 attached to a piston rod of a hydraulic actuator.

The cover 70 of FIGS. 4a-4d is substantially the same as that shown in FIG. 3 with the exception that the alignment means instead includes two axially extending arms 25. The arms 25 of this embodiment extend along outer diameter surface of the rod eye 14 such that the clevis 52 will prevent rotation of the arms 25 about the axis of the shaft 12. The arms 25 are biased to deflect towards the rod eye 14 to grip thereon.

FIG. 4a shows the cover 70 aligned with the rod end 10 ready for assembly thereto. The cover 70 is oriented such that the deformable fingers 32 are aligned with the widest part of the rod eye 14 so that when the cover 70 is pushed onto the rod end 10 (as shown in FIG. 4b) the fingers 32 can expand over the widest part of the rod end 10.

When the cover 70 is in an axial position whereby the skirt 22 is positioned over the slot in the rod end 10 the cover 70 is twisted about the rod end axis by about 90 degrees such that the arms 25 are aligned with the rod eye 14 and the splits 30 are oriented away from the slot in the rod end 10 as shown in FIG. 4c. A strap 40 can then be attached within the grove 26.

FIG. 4d shows the cover 70 mounted to the rod end 10 with the strap 40 tightened thereto.

Although the examples shown include a collar 21 in the form of an internal flange for mounting against the rod end flange 16, it will be appreciated that any internal surface of the collar 21 that can be mounted or secured to the flange 16 of the rod end could be used.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims

The invention claimed is:

1. A cover for a rod end of an actuator, comprising:
 a mounting collar for surrounding and mounting to a portion of the rod end, the collar being deformable such that it may be mounted over a rod eye mounted to the rod end; and
 a shield extending from the collar and shaped such that when attached to the rod end the shield shields a portion of rod end to prevent fluid or foreign object ingress,
 wherein the collar includes at least two splits circumferentially spaced from one another, wherein the at least two splits extend down the collar and part of the length of the shield to define a deformable finger therebetween;
 wherein the cover further comprises an alignment portion for preventing axial movement of the cover relative to the rod eye; and
 wherein the alignment portion comprises two diametrically opposed arms extending from the collar in an opposite axial direction to the shield.

2. The cover of claim 1, wherein the shield comprises a skirt for extending around the entire circumference of the mounting collar and projecting therefrom.

3. The cover of claim 2, wherein the skirt comprises a hollow cylindrical tube.

4. The cover of claim 1, wherein the cover further comprises a strap surrounding the collar or shield for securing the cover onto the rod end.

5. A rod end assembly comprising:
 a rod end comprising a hollow shaft and a rod eye mounted to an end of the shaft, the shaft end having an opening extending through a wall thereof; and
 a cover mounted to the rod end, the cover comprising a mounting collar mounted to a portion of the rod end, the collar being deformable such that it may be mounted to the rod end over the rod eye, wherein the cover further comprises a shield extending from an internal surface of the cover and shielding the opening in the shaft wall to prevent fluid or foreign object ingress to the rod end,
 wherein the collar includes at least two splits circumferentially spaced from one another, wherein the at least two splits extend down the collar and part of the length of the shield to define a deformable finger therebetween.

6. The assembly of claim 5, wherein the shield comprises a skirt for extending around the entire circumference of the mounting collar and projecting therefrom.

7. The assembly of claim 6, wherein the skirt comprises a hollow cylindrical tube.

8. The assembly of claim 5, wherein the cover further comprises an alignment portion for preventing axial movement of the cover relative to the rod eye.

9. The assembly of claim 8, wherein the alignment portion comprises:
 a loop extending from one side of the collar to the opposite side of the collar on the opposite side of the collar from the shield.

10. The assembly of claim 8, wherein the alignment portion comprises:
 two diametrically opposed arms extending from the collar in an opposite axial direction to the shield.

11. The assembly of claim 10, wherein the collar or shield includes a circumferential groove for housing the strap.

12. The assembly of claim 5, wherein the cover further comprises a strap surrounding the collar or shield for securing the cover onto the rod end.

13. A method of assembling a rod end and cover, the method comprising;
 providing a rod end comprising a hollow shaft and a rod eye mounted to the end of the shaft, the shaft end having an opening extending through a wall thereof, the rod end being attached to a piston rod;
 providing a cover, the cover including: a mounting collar for surrounding and mounting to a portion of the rod end, the collar being deformable such that it may be mounted over a rod eye mounted to the rod end; and a shield extending from the collar and shaped such that when attached to the rod end the shield shields a portion of rod end to prevent fluid or foreign object ingress; and
 mounting the cover to the rod end without removing the rod end from the piston rod by pushing the cover onto the rod end while deforming the collar of the cover, wherein deforming the collar includes deflecting fingers formed in the collar; and orienting the fingers such that they deflect over a widest part of the rod eye and then rotating the cover such that the fingers are circumferentially spaced from the opening in the rod end shaft.

14. The method of claim 13, further comprising attaching a strap to the collar or shield after the cover is mounted to the rod end and tightening the strap to secure the cover to the rod end.

\* \* \* \* \*